United States Patent
Brickell

(10) Patent No.: US 7,739,521 B2
(45) Date of Patent: Jun. 15, 2010

(54) METHOD OF OBSCURING CRYPTOGRAPHIC COMPUTATIONS

(75) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2030 days.

(21) Appl. No.: 10/666,632

(22) Filed: Sep. 18, 2003

(65) Prior Publication Data

US 2005/0084098 A1    Apr. 21, 2005

(51) Int. Cl.
*H04L 9/00*    (2006.01)
(52) U.S. Cl. .......................... 713/194; 380/30
(58) Field of Classification Search ................ 713/194, 713/176; 380/1, 30
See application file for complete search history.

(56) References Cited

U.S. PATENT DOCUMENTS

| | | | |
|---|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen |
| 4,521,852 A | 6/1985 | Guttag |
| 4,529,870 A | 7/1985 | Chaum |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |

(Continued)

FOREIGN PATENT DOCUMENTS

DE    42 17 444 A1    12/1992

(Continued)

OTHER PUBLICATIONS

Berg, "How Do I Create A Signed Applet?", Dr. Dobb's Journal, Aug. 1997, pp. 1-9.

(Continued)

*Primary Examiner*—Gilberto Barron, Jr.
*Assistant Examiner*—Simon Kanaan
(74) *Attorney, Agent, or Firm*—Caven & Aghevli LLC

(57) ABSTRACT

Obscuring cryptographic computations may be accomplished by performing modular exponentiation of an exponent in a cryptographic computation such that memory accesses are independent of the exponent bit pattern, thereby deterring timing attacks.

15 Claims, 2 Drawing Sheets

U.S. PATENT DOCUMENTS

| | | |
|---|---|---|
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,628,023 A | 5/1997 | Bryant et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal et al. |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,064,740 A * | 5/2000 | Curiger et al. ............... 380/265 |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,298,442 B1 * | 10/2001 | Kocher et al. ............... 713/194 |
| 6,301,646 B1 | 10/2001 | Hostetter |
| 6,308,270 B1 | 10/2001 | Guthery |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams et al. |
| 6,374,286 B1 | 4/2002 | Gee et al. |
| 6,374,317 B1 | 4/2002 | Ajanovic et al. |
| 6,378,068 B1 | 4/2002 | Foster et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |

| | | | |
|---|---|---|---|
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough | |
| 6,463,535 B1 | 10/2002 | Drews | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 7,058,808 B1 * | 6/2006 | Zolotorev et al. | 713/176 |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0018892 A1 | 1/2003 | Tello | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |

FOREIGN PATENT DOCUMENTS

| | | | |
|---|---|---|---|
| EP | 0 473 913 A2 | | 3/1992 |
| EP | 0 600 112 A1 | | 6/1994 |
| EP | 0 602 867 A1 | | 6/1994 |
| EP | 0 892 521 A2 | | 1/1999 |
| EP | 0 930 567 A2 | | 7/1999 |
| EP | 0 961 193 A2 | | 12/1999 |
| EP | 0 965 902 A2 | | 12/1999 |
| EP | 1 030 237 A1 | | 8/2000 |
| EP | 1 055 989 A1 | | 11/2000 |
| EP | 1 056 014 A1 | | 11/2000 |
| EP | 1 085 396 A1 | | 3/2001 |
| EP | 1 146 715 A1 | | 10/2001 |
| EP | 1 209 563 A2 | | 5/2002 |
| EP | 1 271 277 A2 | | 1/2003 |
| JP | 2000-76139 | | 3/2000 |
| WO | WO 95/24696 | | 9/1995 |
| WO | WO 97/29567 | | 8/1997 |
| WO | WO 98/12620 | | 3/1998 |
| WO | WO 98/34365 | | 8/1998 |
| WO | WO 98/44402 | | 10/1998 |
| WO | WO 99/05600 | | 2/1999 |
| WO | WO 99/09482 | | 2/1999 |
| WO | WO 99/18511 | | 4/1999 |
| WO | WO 99/57863 | | 11/1999 |
| WO | WO 99/65579 | | 12/1999 |
| WO | WO 00/21238 | | 4/2000 |
| WO | WO 00/62232 | | 10/2000 |
| WO | WO 01/27723 A1 | | 4/2001 |
| WO | WO 01/27821 A2 | | 4/2001 |
| WO | WO 01/63994 A2 | | 8/2001 |
| WO | WO 01/75564 A2 | | 10/2001 |
| WO | WO 01/75565 A2 | | 10/2001 |
| WO | WO 01/75595 A2 | | 10/2001 |
| WO | WO 02/01794 A2 | | 1/2002 |
| WO | WO 02/17555 A2 | | 2/2002 |
| WO | WO 02/060121 A1 | | 8/2002 |
| WO | WO 02/086684 A2 | | 10/2002 |
| WO | WO 03/058412 A2 | | 7/2003 |

OTHER PUBLICATIONS

Brands, "Restrictive Blinding of Secret Key Certificates", SP-002201306, 1995, pp. 1-35, Netherlands.

Chien, "Safe and Protected Execution for the Morph/AMRM Reconfigurable Processor", 7th Annual IEEE Symposium, Apr. 1999, pp. 209-221, Los Alamitos, CA, USA.

Compaq Computer Corp.,"Trusted Computing Platform Alliance (TCPA): Main Specification Version 1.1a", XP002272822, 2000-2001, pp. 1-321, USA.

Coulouris, et al., Distributed Systems: Concepts and Designs: 14.4: Concurrency Control in Distributed Transaction, 1994, pp. 422-424, 2nd ed., Addision-Wesley Pub. Co.

Crawford, "Architecture of the Intel 80386", IEEE International Conference on Computer Design, VLSI in Computers, Oct. 6-9, 1986, pp. 155-160, New York, USA.

Davida, et al., "Defending Systems Against Viruses through Cryptographic Authentication", IEEE 1989, pp. 312-318, Wisconsin, USA.

Fabry, "Capability-Based Addressing", Communications of the ACM, Jul. 1974, pp. 403-412, vol. 17, No. 7, USA.

Frieder, "The Architecture and Operation Characteristics of the VMX Host Machine", IEEE 1982, pp. 9-16, USA.

Goldberg, "Survey of Virtual Machine Research", Computer Magazine, Jun. 1974, pp. 4-15, vol. 7, No. 6, USA.

Gong, "Going Beyond the Sandbox: An Overview of the New Security Architecture in the Java Development Kit 1.2", USENIX Symposium on Internet technologies and Systems, Dec. 1997, California, USA.

Gum, "System/370 Extended Architecture: Facilities for Virtual Machines", IBM J. Res. Develop., vol. 27, No. 6, pp. 530-543, Nov. 1983.

Heinrich, MIPS R4000 Microprocessor User's Manual, Chapter 4: "Memory Management" XP-002184449, MIPS Technology, 1994, pp. 61-97, California, USA.

Hewlett-Packard Co., "Mobile Security Overview", Sep. 2002, pp. 1-9, USA.

IBM Corporation, Information Display Technique for a Resident Program Technical Disclosure Bulletin, Dec. 1991, vol. 34, No. 7A, USA.

IBM Corporation, "IBM ThinkPad T30 Notebooks", Apr. 2002, pp. 1-6.

Intel Corporation, "Intel 386 DX Microprocessor 32-Bit CHMOS Microprocessor with Integrated Memory Management", Dec. 1995, pp. 2-56.

Intel Corporation, IA-32 Intel Architecture Software Developer's Manual: vol. 3: System Programming Guide.

Intel Corporation, "Intel 82082AB/82802AC Firmware Hub (FWH)", Nov. 2000, pp. 1-28, XP-002257561, USA.

IA-64 System Abstract Layer Specification, Jan. 2000, pp. 1-1 to 3-21, XP-002253057, USA.

Karger et al., "A VMM Security Kernel for the VAX Architecture", IEEE 1990, pp. 2-19, Boxborough, USA.

Kashiwagi, et al., "Design and Implementation of Dynamically Reconstructing System Software", IEEE 1996, pp. 278-287, Ohio, USA.

Lawton, "Running multiple operating systems concurrently on an IA32 PC using virtualization techniques", Nov. 29, 1999, pp. 1-31, http://www.plex86.org/research/paper.txt.

Luke et al., "Replacement Strategy for Aging Avionics Computers", IEEE AES Systems Magazine, Mar. 1999, XP-002190614, pp. 7-10, AFRL, Wright-Patterson AFB, OH, USA.

Menezes et al., "Handbook of Applied Cryptography", CRC Press Series on Discrete Mathematics and its Applications, Boca Raton, FL XP002165287, ISBN 0849385237, (Oct. 1996), 403-405, 506-515,570.

Menezes et al., "Signatures with additional functionality", XP-002201307, p. 475, PD 00-00-1997.

Motorola, "M68040 User's Manual", Motorola, Inc., 1990.

Nanba, et al., "VM/4: ACOS-4 Virtual Machine Architecture", IEEE, 1985, pp. 171-178, USA.

Richt et al., "In-Circuit-Emulator wird echtzeittauglich", Elektronik, Aug. 1991, No. 16, pp. 100-103, Muchen, Germany.

Robin et al., "Analysis of the Intel Pentium's Ability to Support a Secure Virtual Machine Monitor", USENIX Assoc. 2000, pp. 1-17, Colorado, USA.

Rosenblum, "Vmware's Virtual Platform", Proceedings of Hot Chips 11, Aug. 11-17, 1999, pp. 185-196, USA.

"Hardware Authenticators", http://ww.rsasecurity.com/node.asp?id-1.31.3, 2004.

RSA Security, "RSA SecurID Authenticators: The gold standard in two-factor user authentication", 2003, pp. 1-2.

Saez et al., "A Hardware Scheduler for Complex Real-Time Systems", XP-002190615, IEEE 1999, pp. 43-48, Spain.

Schneier, "Basic Protocols", Applied Cryptography, 1996 pp. 47-52, 2nd Edition (XP002939871), John Wiley & Sons, New York, NY, USA.

Schneier, "Basic Protocols", Applied Cryptography, 1996, pp. 56-65 (XP-002138607), 2nd Edition, John Wiley & Sons, New York, NY, USA.

Schneier, "Key Management", Applied Cryptography, 1996, pp. 169-187 (XP-002111449), 2nd Edition John Wiley & Sons, New York, NY, USA.

Schneier, Applied Cryptography, 1996, pp. 28-33, 176-177, 216-217, 461-473, 518-522, 2nd Edition, (XP-002251738), John Wiley & Sons, New York, NY, USA.

Sherwood et al., Patchable Instruction ROM Architecture: Cases '01, Nov. 17-17, 2001, (XP-002254429), pp. 24-33, Georgia, USA.

"Trusted Computing Platform Alliance (TCPA): Main Specification Version 1.0", Jan. 25, 2001, pp. 122-227, (XP-002272822), USA.

Schneier, Challenge-Response Identification (strong authentication), pp. 403-405, 506-515, 570, (XP-002165287), 1997.

Ateniese et al.: A Practical and Provable Secure Coalition-Resistant Group Signature Scheme; Advances in Cryptology—CRYPTO2000, vol. 1880 of Lecture Notes in Computer Science, INt'l Assoc. for Crypt Res. Spring-Verlag, Berlin, Germany, 2000 pp. 255-270.

Intel IA-64 Architecture Software Developer's Manual, vol. 2: IA-64 System Architecture, Jan. 2000, XP-002273175, Order No. 245318-001, 17 pages.

RSA Security—Software Authenticators; http://www.rsasecurity.com/node.asp?id-1313; 2 pages.

* cited by examiner

METHOD OF OBSCURING CRYPTOGRAPHIC COMPUTATIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to cryptography and, more specifically, to deterring attacks based at least in part on observing cryptographic computations in a processing system.

2. Description

Public key cryptography is well-known and widely used today. In public key cryptography, each user has a public key and a private key. The public key is made public, while the private key remains secret. Encryption is performed with the public key, while decryption is done with the private key.

The most popular form of public key cryptography today is the Rivest, Shamir, Adleman (RSA) public key cryptosystem. Key generation in the RSA algorithm works as follows: take two large primes, p and q, and compute their product n=p*q; n is called the modulus. Choose a number, called the encryption exponent e, less than n and relatively prime to (p−1)*(q−1), which means e and (p−1)*(q−1) have no common factors except 1. Find another number, called the decryption exponent d, such that (e*d−1) is divisible by (p−1)*(q−1). The values e and d are also called the public and private exponents, respectively. The public key is the pair (n, e) and the private key is the exponent d. The factors p and q may be destroyed or kept with the private key.

Encryption and decryption may be performed as follows. Suppose Alice wants to send a plaintext message m ($0 \leq m \leq n-1$) to Bob. Alice creates the ciphertext message c ($0 \leq c \leq n-1$) by exponentiating c=$m^e$ mod n, where e and n are Bob's public key. She sends c to Bob. To decrypt, Bob exponentiates m=$c^d$ mod n; the relationship between e and d ensures that Bob correctly recovers m. Since only Bob knows d, only Bob can decrypt this message.

RSA is also commonly used to exchange a symmetric key. A symmetric key may be used to encrypt data. The symmetric key may then be encrypted by a sender using the receiver's public key. In this usage, the message m is a specific formatting of the symmetric key. Once the receiver receives and decrypts the symmetric key, the receiver can then use the symmetric key to decrypt the data.

It is currently very difficult to obtain a private key d from the public key (n, e). However, if one could factor n into p and q, then one could obtain the private key d. Thus, the security of the RSA system is based on the assumption that such factoring is difficult.

Other attacks on the RSA system have been attempted. In some sophisticated attack scenarios, d may inferred from information gathered from observing a processing system performing the modular exponentiation operation used in decryption. In these scenarios, observing memory access patterns, cache line accesses, and/or branches taken in executing code within the processing system may give the attacker sufficient information to deduce the private key. Hence, obscuring cryptographic computations such that observation of the memory access patterns, cache line accesses, and/or branches taken in executing code while performing the computations provides no meaningful information to an attacker is desirable.

BRIEF DESCRIPTION OF THE DRAWINGS

The features and advantages of the present invention will become apparent from the following detailed description of the present invention in which.

DETAILED DESCRIPTION

Figure 1:
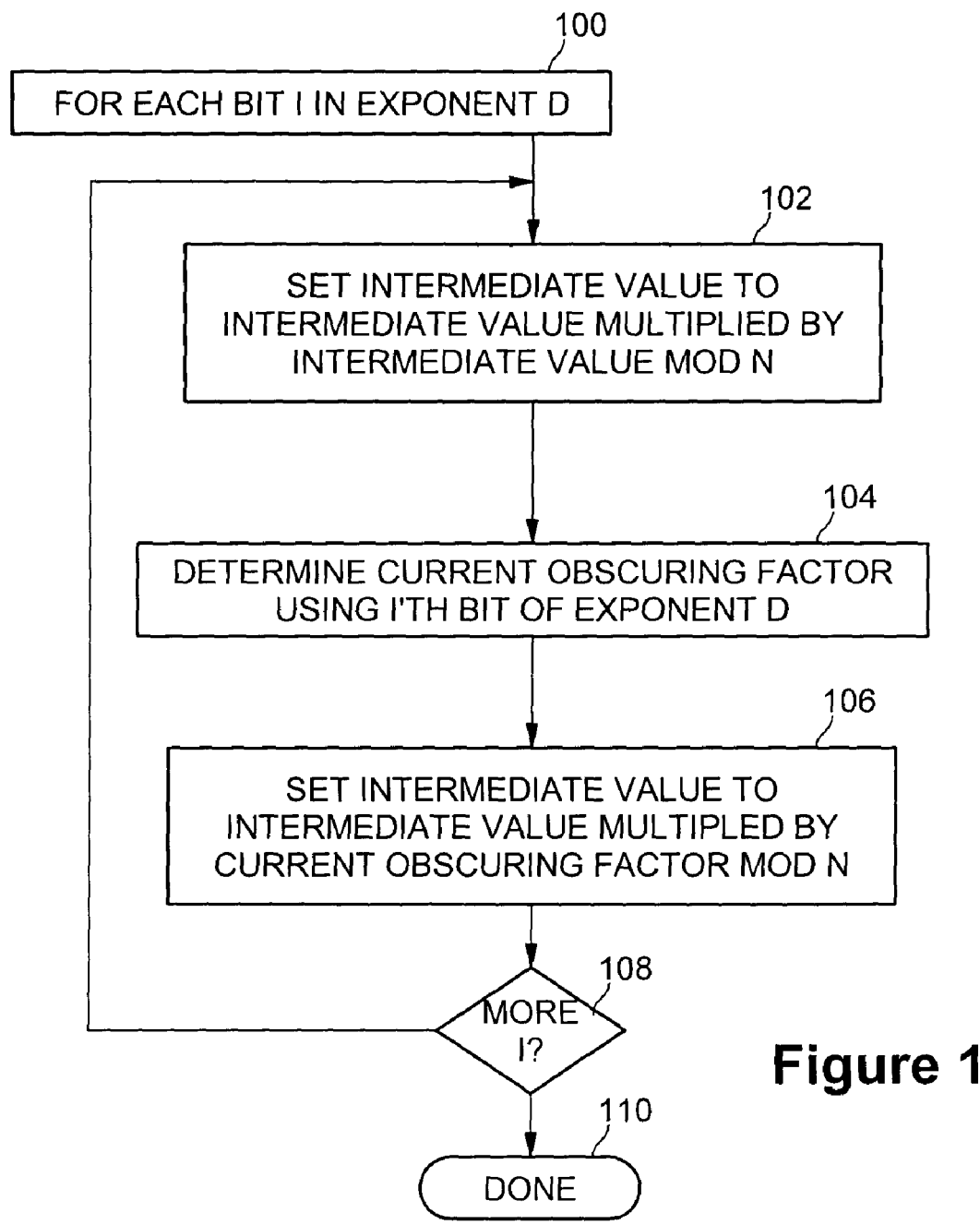
FIG. 1 is a flow diagram illustrating obscuring cryptographic computations according to an embodiment of the present invention.

An embodiment of the present invention is a method for implementing a variant of the RSA algorithm in a secure manner to deter against attacks by obscuring cryptographic computations such that an attacker can gain no meaningful information by observing, for example, memory access patterns, cache line accesses, or code branches of a processing system. Embodiments of the present invention provide a method of performing an implementation of the RSA algorithm such that memory access is independent of the bit pattern of the exponents used. Embodiments of the present invention present a new way to protect against timing attacks. Embodiments of the present invention are also more efficient than previous methods.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

To decrypt a ciphertext message c using the RSA system to obtain the plaintext message m, operations are performed to compute $c^d$ mod n. An attacker may be able obtain c by capturing communications between a sender and a receiver, and n is known from the public key, but the difficulty in making the attack is in determining d. If an attacker can monitor or otherwise observe a processing system during a decryption operation, the attacker may be able to infer or deduce what d is. Once d is known, the attacker can decrypt any messages encrypted with the sender's corresponding public key. In some scenarios, observing memory access patterns, cache line accesses, and/or branches taken or not taken in executing code may help the attacker obtain d. In some instances, this observation may be made using a logic analyzer on a processing system performing the decryption operation.

One known implementation of the RSA algorithm for decryption is shown in Table 1. $d_i$ will denote the i'th bit of d. Specifically, $$d = \sum_{i=0}^{k-1} d_i 2^i,$$

where k is the number of bits in the binary representation of d. In other words, $2^{k-1} \leq d < 2^k$.

TABLE I

```
1: Let k = log₂ n     /* k is the number of bits in d */
2: x: = c             /* store ciphertext c in intermediate
                         value variable */
3: For i = 2 to k     /* loop through all bits in d */
4:    x:= x * x MOD n
5:    If d_{k−i} = 1, /* if i'th most significant bit of d is set */
6:       then x := x * c mod n
7: End For
8: m:= x              /* store recovered plaintext m */
```

The well-known implementation shown in Table I may be vulnerable to observations by an attacker because the memory reference to c in line 6 only occurs when the i'th bit of decryption exponent d is set to 1. When the i'th bit of decryption exponent d is 0, no memory access is made. If an attacker observes the memory access activity during decryption processing, the attacker may obtain the bit pattern for d. Furthermore, monitoring of whether the branch is taken at line 5 may provide the same information. Once the attacker learns d, the attacker can obtain m.

To avoid this scenario, an embodiment of the present invention performs decryption processing wherein memory access is independent of the decryption exponent bit pattern. Table II shows an embodiment of the present invention wherein lines 5 and 6 of the prior art method may be replaced by processing designed to obfuscate decryption computations.

TABLE II

```
© 2003 Intel Corporation
1: Let k = log₂ n     /* k is the number of bits in d */
2: x: = c             /* store ciphertext c in intermediate value
                         variable */
3: For l = 2 to k     /* loop through all bits in d */
4:    x := x * x MOD n
5:    r := (c −1) * d_{k−l} + 1   /* determine obscuring factor */
6:    x := x * r MOD n    /* use obscuring factor */
7: End For
8: m := x             /* store plaintext m */
```

In this embodiment, an obscuring factor r is used. By using this obscuring factor in the multiplication at line 6, there is no conditional memory access or branch pattern. Each iteration i through the bits of decryption exponent d involves a memory access to obtain c in line 5 and a multiplication in line 6, regardless of the bit pattern of d. Thus, no pattern may be observed by an attacker. When $d_i=0$, then r=1 in line 5, and a multiplication by 1 is performed in line 6. When $d_i=1$, then r=c in line 5, and a multiplication by c is performed in line 6. Furthermore, there is no branch activity (from evaluating an "if" statement) that can be observed to deduce d. At the end of processing in Table II, intermediate variable x stores the same value as at the end of processing in Table I (that is, the ciphertext c has been decrypted into plaintext m).

FIG. 1 is a flow diagram illustrating obscuring cryptographic computations according to an embodiment of the present invention. In general terms, lines 3 through 6 of Table II are represented as a flow diagram. At block 100, as part of decryption processing, a loop may be set up to iterate through each bit i in the decryption exponent d. At block 102, an intermediate value (initially storing ciphertext c) may be set to the intermediate value multiplied by the intermediate value mod n. At block 104, the current obscuring factor r may be determined using the i'th bit of decryption exponent d. In one embodiment, the obscuring factor r may be set to $(c-1)*d_i+1$. At block 106, the intermediate value may be set to the intermediate value multiplied by the current obscuring factor r mod n. At block 108, if there are more bits in d to process, the next i is selected and processing loops back to block 102 for the next iteration of the loop. If all bits of d have been processed, then processing ends at block 110.

Thus, a conditional multiplication operation during decryption processing has been replaced with an unconditional multiplication operation such that the end result is equivalent. The method thus performs the decryption operation where memory accesses are independent of the decryption exponent bit pattern and there are no branches to be observed.

In some computing systems, the time to perform a multiply operation by one or by zero may be different than the time to perform a multiply operation by a random number (such as c, for example). An attacker may be able to detect this difference in multiplication times to infer the decryption exponent. Another embodiment of the present invention obscures this evidence by changing the way the obscuring factor may be determined. In this embodiment, an arithmetic selection of r is performed by using logical operations to avoid a multiplication by $d_i=0$ that could occur in line 5 of Table II. This embodiment avoids the multiplications by one that could occur in line 6 of Table II by always multiplying by a random obscuring factor. Table III shows an embodiment of the present invention wherein the method of Table II may be modified to further obfuscate decryption computations.

TABLE III

```
© 2003 Intel Corporation
1: Let k = log₂ n          /* k is the number of bits in d */
2: Pick t at random MOD n              /* random number t */
3: y := c * t MOD n        /* store ciphertext c in intermediate value y using t */
4: w := c * t⁻¹ MOD n      /* determine first obscuring factor w */
5: s := t⁻¹ MOD n          /* determine second obscuring factor s */
6: For i = 0 to k−1        /* loop through all bits of d */
7:    y := y * y MOD n
8:    r := (w AND d_i) OR (s AND (NOT d_i))   /* determine third obscuring factor */
9:    y := r MOD n         /* use third obscuring factor r */
10: End For
11: m := y * s MOD n       /* compute plaintext m using second obscuring factor */
```

In the embodiment shown in Table III, a random number t is picked, wherein t is between 1 and n−1. The third obscuring factor r will evaluate to either the first obscuring factor w (when $d_i=1$) or the second obscuring factor s (when $d_i=0$). This embodiment eliminates the multiplication by one inherent in the embodiment of Table II. It is unlikely that either w or s will be zero or one, considering that t is picked at random from a large number set (1 . . . n−1). In some embodiments, n may comprise $2^{1024}$ bits. Note that at each iteration of the For loop, the y calculated in this embodiment will satisfy y=x*t mod n, where x is the value calculated in a given iteration i of the embodiment shown in Table II.

Figure 2:
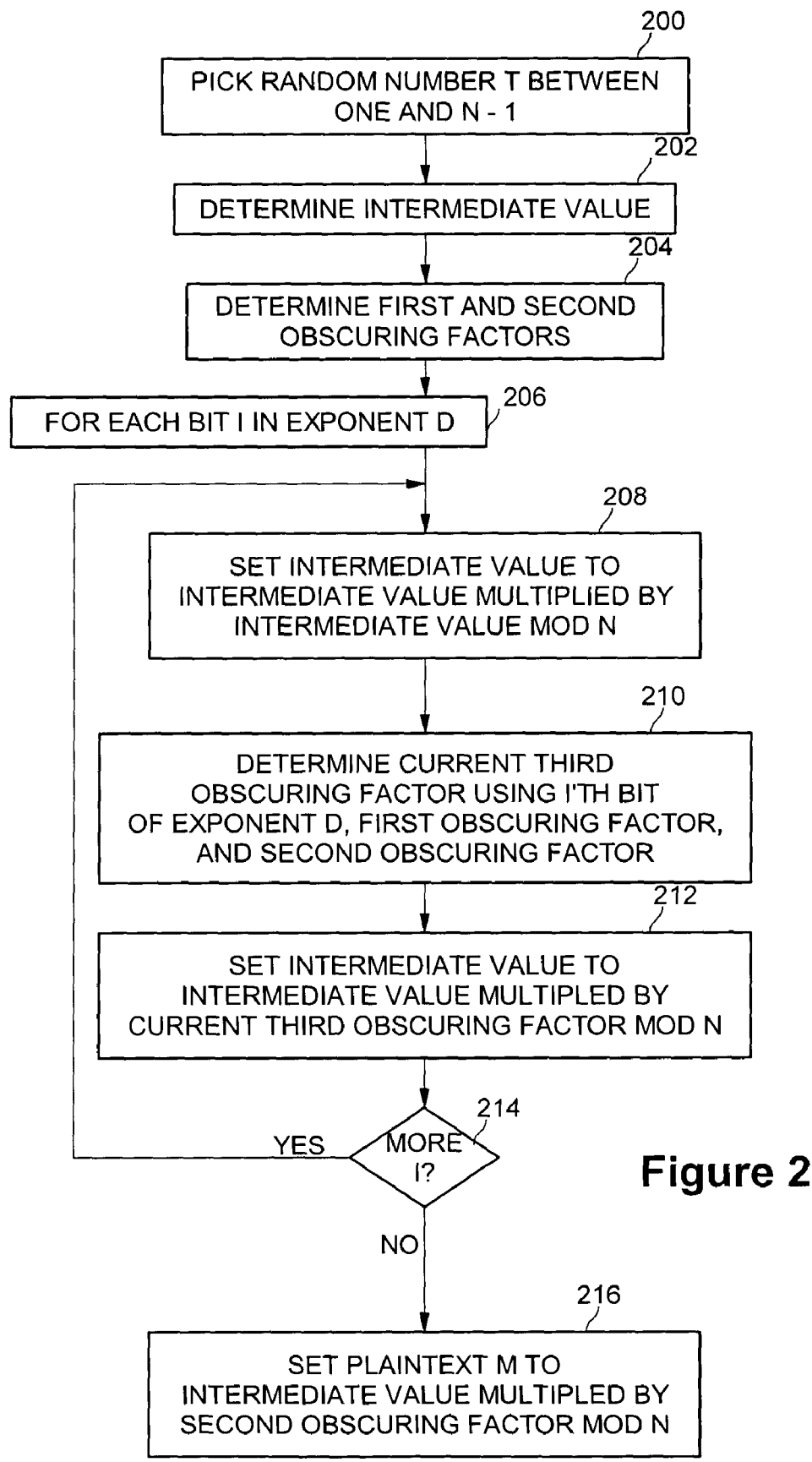
FIG. 2 is a flow diagram illustrating obscuring cryptographic computations according to another embodiment of the present invention.

FIG. 2 is a flow diagram illustrating obscuring cryptographic computations according to an embodiment of the present invention. In general terms, lines 2 through 11 of Table III are represented as a flow diagram. At block 200, as part of decryption processing, a random number t may be picked in the range 1 to n−1. At block 202, an intermediate value may be determined using the plaintext message m, random number t, and the modulus n. At block 204, first and second obscuring factors may be determined. The first obscuring factor w may be set to the plaintext m* random number t mod n. The second obscuring factor s may be set to the inverse of the random number t mod n. A loop may be set up to iterate through each bit i in the decryption exponent d. At block 208, the intermediate value determined at block 202 may be set to the intermediate value multiplied by the intermediate value mod n. At block 210, the third obscuring factor r may be determined using the i'th bit of decryption exponent d, the first obscuring factor w, and the second obscuring factor s. In one embodiment, the third obscuring factor r may be set to (w AND $d_i$) OR (s AND (NOT $d_i$)). At block 212, the intermediate value may be set to the intermediate value multiplied by the current third obscuring factor r mod n. At block 214, if there are more bits in d to process, the next i is selected and processing loops back to block 208 for the next iteration of the loop. If all bits of d have been processed, then processing continues with block 216. At block 216, plaintext m may be obtained by computing the intermediate value multiplied by the second obscuring factor mod n.

Thus, in this embodiment, a conditional multiplication operation during decryption processing has also been replaced with an unconditional multiplication operation such that the end result is equivalent. The method performs the decryption operation (in this example) where memory accesses are independent of the decryption exponent bit pattern and there are no branches to be observed. However, in this embodiment, no pattern of multiplying by ones or zeros may be detected.

One known method of computing modular exponentiation is called the window method (also known as the m-ary sliding window method). In the window method, the exponent (such as the decryption exponent d or the encryption exponent e) may be divided into blocks of bits, where v is the number of bits per block. Each block is a "window" into a portion of the exponent. The window method employs a pre-computation of the powers of the message (such as the ciphertext c for decryption or the plaintext m for encryption) from 1 to $2^v−1$. Then, for each bit in the exponent, a squaring operation is performed. Finally, for each window in the exponent, a multiply operation is performed using the appropriate pre-computed power of the message corresponding to the current window and the current window's bits. The appropriate pre-computed power of the message is typically accessed from memory prior to performing the multiply operation.

When using the embodiment of the present invention shown in Table II as applied to the window method, a multiply operation may be performed if the window into the exponent d has a value that is not all zeroes. In order to obfuscate the memory access when obtaining the appropriate pre-computed power of the message (e.g., c), in an embodiment of the present invention all of the powers of the message from 1 to $2^v$ may be obtained from memory for each multiply operation even though only one of the powers is actually used in a given iteration. By obtaining all powers for each multiply operation, the memory accesses are independent of which of the powers is being used in a particular multiply operation. Hence, this deters an attacker from obtaining information about the message which may be used to deduce the decryption exponent d. The appropriate power of the message may be selected according to $c^a$ where a is the value of the current window into the exponent. This is illustrated in Table IV.

TABLE IV

© 2003 Intel Corporation
1: v: = the number of bits in the window.
2: $c_0$ = 1
3: For i = 1 to $2^v$-1    /* loop through each integer less than $2^v$ */
4:     $c_i$ = $c_{i-1}$ * c MOD n /* compute $c_i$ = $c^i$ MOD n */
5: End for
6: k: = $\log_2$ n       /* k is the number of bits in d */
7: Compute $k_v$ and $r_n$ such that k−1 = v*$k_v$ + $r_v$ and 0 ≦ $r_v$ <v    /* $k_v$ is the quotient and $r_v$ is the remainder when k−1 is divided by v */
8: x: = c            /* store ciphertext c in intermediate value variable */
9: For j = 0 to $r_v$   /* special loop for the top window which may have fewer than v bits in it*/
10:      x:=x * xMODn
11: End for 12:
$$w := \sum_{j=0}^{r_v-1} d_{vk_v} 2^j \quad /* \text{ w is the value of the top window, which has } r_v \text{ bits in it }*/$$

13: Set $b_j$ := 0 for j = 0 to $r_v$ − 1.
14: $b_w$ = 1.

15:
$$r := \sum_{j=0}^{r_v-1} c_j b_j \quad /* \text{ determine obscuring factor } r = c_w */$$

16: x := x * r MOD n       /* use obscuring factor */
17: For i = 1 to $k_v$,      /* loop for all of the windows of v bits each */
18:   For j = 0 to v TABLE IV-continued

```
19:        x:= x * x MOD n    /* perform the squares for this window */
20: End for
```

21:
$$w := \sum_{j=0}^{v-1} d_{v(k_v - i)} 2^j \quad /* \text{ w is the value of i'th window } */$$

```
22: Set b_j := 0 for j = 0 to v − 1.
23: b_w = 1.
```

24:
$$r := \sum_{j=0}^{v-1} c_j b_j \quad /* \text{ determine obscuring factor } r = c_w */$$

```
25: x := x * r MOD n    /* use obscuring factor */
26: End For
27: m:= x    /* store plaintext m */
```

According to this embodiment, a conditional selection of the power of the message at a given iteration of the window method is replaced by the action of obtaining all powers of the message at each iteration, and then choosing the appropriate power to use for a given iteration.

When using the embodiment of the present invention shown in Table III as applied to the window method, each of the pre-computed powers of the message (e.g., c) may be multiplied by $s^{(2^v-1)}$ mod n. This is illustrated in Table V.

TABLE V

© 2003 Intel Corporation
```
1: v: = the number of bits in the window.
2: Pick t at random MOD n                /* random number t */
3: s := t^−1 MOD n                       /* determine second obscuring factor s */
```

4: $s_v = s^{2^\wedge v - 1}$ MOD n

```
5: g_0 = 1.
6: c_0 = s_v.
7: For i = 1 to 2^v−1      /* loop through each integer less than 2^v to determine
all 2^v obscuring factors*/
8:       g_i = g_{i−1} * c   MOD n
```

9:
$$c_j = g_j * s_v \text{ MOD n} \quad /* \text{ compute } c_j = c^i \; s^{2^\wedge v - 1} \text{ MOD n } */$$

```
10: End for
11: k: = log_2 n   /*k is the number of bits in d*/
12: Compute k_v and r_v such that k−1 = v*k_v + r_v and 0 ≤ r_v < v    /* k_v is
the quotient and r_v is the remainder when k−1 is divided by v */
13: y := c * t MOD n                    /* store ciphertext c in intermediate value y
using t */
14: For j = 0 to r_v     /* special loop for the top window which may have
fewer than v bits in it*/
15:    y:=y *y MOD n
16: End for
```

17:
$$w := \sum_{j=0}^{r_v - 1} d_{vk_v} 2^j \quad /* \text{ w is the value of the top window, which has } r_v \text{ bits in}$$

```
it */
18: Set b_j := 0 for j = 0 to r_v − 1.
19: b_w = 1.
20: r = (c_0 AND b_0) OR (c_1 AND b_1 ) OR ... OR (c_{r^v−1} AND b_{r^v−1})
21: y := y * r MOD n                    /* use obscuring factor */
22: h = 2^v − 2^{r_v}
23: y := y * t^h MOD n                  /* Correction factor needed for first window since it is
less that v bits */
24: For i = 1 to k_v                    /* loop for all of the windows of v bits each */
25:    For j = 0 to v
26:       y:= y * y MOD n               /* perform the squares for this window */
27:    End for
```

TABLE V-continued

28:
$$w := \sum_{j=0}^{v-1} d_{v(k_v-i)} 2^j \quad /* \text{ w is the value of i'th window } */$$

29: Set $b_j := 0$ for $j = 0$ to $v - 1$.
30: $b_w = 1$.
31: $r = (c_0 \text{ AND } b_0) \text{ OR } (c_1 \text{ AND } b_1) \text{ OR } ... \text{ OR } (c_{v-1} \text{ AND } b_{v-1})$
32: $y := y * r \text{ MOD } n$ /* use obscuring factor */
33: End For
34: $m := y * s \text{ MOD } n$ /* compute plaintext m using second obscuring factor */

Although the embodiments shown in Tables II, III, IV, and V illustrate decryption processing as an example, embodiments of the present invention may also be used to protect encryption processing as well. Further, embodiments of the present invention may be used in other cryptographic systems where exponentiation is used. For example, exponentiation is used in the well-known Diffie-Hellman key exchange, and also in the well-known Digital Signature Algorithm (DSA). In both of these algorithms, there is a modular exponentiation operation in which the exponent used is a randomly generated secret. Embodiments of the present invention may be used to deter attacks against these systems, and against any systems using a modular exponentiation operation.

Additionally, RSA may also be used for digital signatures. Embodiments of the present invention may be used for deterring attacks on digital signatures using RSA. In this scenario, a signer starts with a message m that he or she wants to sign. The signer transforms m into h, using a hashing and formatting protocol. The signer then computes the signature of h by $s=h^d \mod n$. The signer sends the signature s and the message m to a verifier. The verifier transforms m into h, using the same hashing and formatting protocol. The verifier then computes $h'=s^e \mod n$, and would accept the signature if $h=h'$. The modular exponentiations in the signing computations $s=h^d \mod n$, and $h'=s^e \mod n$, may also be obscured using the techniques disclosed herein.

Another embodiment of the invention can be used on an alternative exponentiation algorithm. The algorithm described in this invention processes the bits of the exponent starting with the high order bits. This is the most common implementation. However, an alternate exponentiation algorithm processes bits starting from the low order bits. The invention described here can be applied to that algorithm as well.

Embodiments of the present invention implement modular exponentiation for either encryption or decryption in the RSA algorithm (and may be applied to other cryptographic systems) in a secure manner even if an attacker has knowledge of what memory is accessed and what code branches (if any) are taken during execution of the algorithm. The invention thus provides better security than prior art implementations.

Although the following operations may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising: performing modular exponentiation in a cryptographic computation such that memory accesses are independent of the numerical value of the exponent, wherein said performing modular exponentiation is to comprise replacing a conditional multiplication operation with an unconditional multiplication operation and the unconditional multiplication operation is to be based on an obscuring factor; and determining the obscuring factor for each bit of the exponent by adding one to a result of multiplying a quantity by a selected bit of the exponent, the quantity comprising a message minus one.

2. The method of claim 1, wherein the exponent comprises at least one of a signature exponent and a decryption exponent in a RSA cryptographic system, and the cryptographic computation is at least one of signature and decryption.

3. The method of claim 2, wherein the cryptographic computation comprises $c^d$ mod n, wherein c comprises a ciphertext message, d comprises the decryption exponent, and n comprises a modulus that is a product of two prime numbers.

4. The method of claim 1, wherein the modular exponentiation is performed as part of a Diffie-Hellman key exchange process.

5. The method of claim 1, wherein the modular exponentiation is performed as part of a Digital Signature Algorithm (DSA) process.

6. The method of claim 1, further comprising applying a window method as part of performing the modular exponentiation and retrieving pre-computed powers from one to $2^v$ of a message from a memory, where v is the size of a window into the exponent's bits.

7. A method comprising:
setting an intermediate value to a message; and
for each bit i in the exponent, setting the intermediate value to the intermediate value multiplied by the intermediate value mod a modulus, wherein the modulus comprises a product of two prime numbers, determining a current obscuring factor using the i'th bit of the exponent, and setting the intermediate value to the intermediate value multiplied by the current obscuring factor mod the modulus, wherein determining the current obscuring factor comprises determining the current obscuring factor by adding one to a result of multiplying a quantity by a selected bit of the exponent, the quantity comprising the message minus one.

8. The method of claim 7, wherein the exponent comprises at least one of a signature exponent and a decryption exponent in a RSA cryptographic system, and the cryptographic computation is at least one of signature and decryption.

9. The method of claim 7, further comprising applying a window method as part of performing the modular exponentiation and retrieving pre-computed powers from one to $2^v$ of the message from a memory, where v is the size of a window into the exponent's bits.

10. An article comprising: a non-transitory storage medium having a plurality of machine readable instructions, wherein when the instructions are executed by a processor, the instructions provide for obscuring cryptographic computations by performing modular exponentiation of an exponent in a cryptographic computation such that memory accesses are independent of the numerical value of the exponent, wherein a current obscuring factor is to be determined by adding one to a result of multiplying a quantity by a selected bit of the exponent, the quantity to comprise a message minus one.

11. The article of claim 10, wherein performing modular exponentiation comprises replacing a conditional multiplication operation with an unconditional multiplication operation.

12. The article of claim 10, further comprising instructions for applying a window method as part of performing the modular exponentiation and retrieving pre-computed powers from one to $2^v$ of a message from a memory, where v is the size of a window into the exponent's bits.

13. An article comprising: a non-transitory storage medium having a plurality of machine readable instructions, wherein when the instructions are executed by a processor, the instructions provide for obscuring cryptographic computations by performing modular exponentiation of an exponent in a cryptographic computation such that memory accesses are independent of the exponent bit pattern, the instructions causing setting an intermediate value to a message; and for each bit i in the exponent, setting the intermediate value to the intermediate value multiplied by the intermediate value mod a modulus, wherein the modulus comprises a product of two prime numbers, determining a current obscuring factor using the i'th bit of the exponent, and setting the intermediate value to the intermediate value multiplied by the current obscuring factor mod the modulus, wherein determining the current obscuring factor is to comprise adding one to a result of multiplying a quantity by a selected bit of the exponent, the quantity to comprise the message minus one.

14. The article of claim 13, wherein the exponent comprises at least one of a signature exponent and a decryption exponent in a RSA cryptographic system, and the cryptographic computation is at least one of signature and decryption.

15. The article of claim 13, further comprising instructions for applying a window method as part of performing the modular exponentiation and retrieving pre-computed powers from one to $2^v$ of a message from a memory, where v is the size of a window into the exponent's bits.

* * * * *